United States Patent [19]

Woodson

[11] Patent Number: 4,806,576

[45] Date of Patent: Feb. 21, 1989

[54] CURABLE EPOXY RESIN COMPOSITIONS AND USE IN PREPARING FORMED, SHAPED, FILLED BODIES

[75] Inventor: Wayne D. Woodson, Danville, Ill.

[73] Assignee: Ashland Oil, Inc., Russell, Ky.

[21] Appl. No.: 95,802

[22] Filed: Sep. 11, 1987

Related U.S. Application Data

[60] Division of Ser. No. 703,090, Mar. 29, 1985, abandoned, which is a division of Ser. No. 436,031, Oct. 22, 1982, Pat. No. 4,518,723, which is a continuation-in-part of Ser. No. 405,420, Aug. 5, 1982, abandoned.

[51] Int. Cl.$^4$ .................. C08K 3/36; C08L 63/02; B22C 9/00; B22C 33/40
[52] U.S. Cl. .................... 523/139; 523/144; 523/145; 523/141; 528/405; 164/16; 264/83
[58] Field of Search ............... 523/139, 466, 144, 145, 523/141; 252/523; 528/109, 405; 164/16; 264/83

[56] References Cited

U.S. PATENT DOCUMENTS

| | | | |
|---|---|---|---|
| 2,795,572 | 6/1957 | Mueller et al. | 260/77.5 |
| 3,107,403 | 10/1963 | Moore | 164/16 |
| 3,108,340 | 10/1963 | Peters et al. | 164/16 |
| 3,404,118 | 10/1968 | Guyer et al. | 523/139 |
| 3,657,381 | 4/1972 | Speitel et al. | 525/149 |
| 3,661,620 | 5/1972 | Dekking et al. | 117/62.2 |
| 3,865,777 | 2/1975 | Wittenwyler | 260/37 |
| 3,879,339 | 4/1975 | Richard | 524/442 |
| 3,947,522 | 6/1976 | Shelley | 260/837 |
| 4,049,745 | 9/1977 | Schuster et al. | 260/837 |
| 4,051,195 | 9/1977 | McWhorter | 260/837 |
| 4,176,114 | 11/1979 | Stewart et al. | 523/144 |
| 4,389,433 | 6/1983 | Pampalone | 427/341 |
| 4,518,723 | 5/1985 | Woodson | 523/466 |

FOREIGN PATENT DOCUMENTS

| | | | |
|---|---|---|---|
| 1055242 | 1/1967 | United Kingdom | 8/86 |
| 2066714 | 7/1981 | United Kingdom | |

*Primary Examiner*—Lewis T. Jacobs
*Attorney, Agent, or Firm*—David L. Hedden

[57] ABSTRACT

Curable epoxy resin compositions are described which comprise a mixture of an acid curable epoxy resin and a minor amount of an oxidizing agent capable of reacting with sulfur dioxide to form a catalyst for curing said epoxy resin. The curable epoxy resin composition may contain solid particulate materials. The procedures for curing such epoxy resins as well as methods for forming sand cores and molds also are described. Sand cores and molds produced in accordance with the method of the invention have sufficient strength and hardness after a few seconds of curing for normal foundry applications.

33 Claims, No Drawings

CURABLE EPOXY RESIN COMPOSITIONS AND USE IN PREPARING FORMED, SHAPED, FILLED BODIES

CROSS-REFERENCE TO RELATED APPLICATION

This is a divisional of application Ser. No. 703,090, filed on Mar. 29, 1985, now abandoned, which is a divisional of application Ser. No. 436,031, filed on Oct. 22, 1982, now U.S. Pat. No. 4,518,723, which is a continuation-in-part of application Ser. No. 405,720, filed on Aug. 5, 1982, now abandoned.

BACKGROUND OF THE INVENTION

This invention relates to new and useful curable epoxy resin compositions comprising acid curable eposy resins and a minor amount of an oxidizing agent which is capable of reacting with sulfur dioxide to form a catalyst for curing said epoxy resin. These curable epoxy resin compositions are useful particularly in preparing formed, shaped, filled bodies which comprise the epoxy resin and inorganic solid particulates. Particularly useful filled bodies of this type include abrasive articles, foundry cores and molds.

Over the last several decades, the so-called "epoxy" resins have gained wide acceeptance in various arts. Epoxy resins possess unusually good electricl, thermal and chemical properties and exhibit low shrinkage during cure. Epoxy resins provide good adhesion to a variety of surfaces of materials, and, consequently, they have been particularly effective in coatings, electronic and electridal applications, and as binders and adhesives in a number of applications. Epoxy resins are characterized by the presence therein of an epoxide group, i.e.,

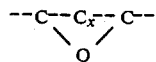

wherein x is a small whole number. Such resins are available commercially from a wide variety of sources. Commercially available products, depending upon the chemical makeup of the epoxy resin, are characterized by a variety of properties.

Epoxide resins are converted to useful forms through condensation reactions which are initiated and/or promoted by means of heat and/or a condensing catalyst or curing agent. Conventionally, the epoxy resins are marketed in the form of liquid or solid compositions comprising the partially condensed resin which may or may not contain the curing agent. A final cure to a solid usable form is effected at the time of use, if a catalyst is present, by heating the composition to a moderately elevated temperature. In many instances, the commercially available epoxy resin compositions will not contain the curing agent or hardener because many curing agents have a certain degree of activity at ambient temperatures, and consequently such compositions would have an undesirable short storage life. Accordingly, producers of epoxy resins sell hardener packages for use with epoxy resins and, generally, such hardeners or curing agents are added to the epoxy resin when it is desired to cure the resin to a solid usable form.

Another method for effecting the cure or hardening of epoxide resins, particularly at ambient temperatures and without requiring the incorporation of a curing agent in the composition itself have been described. For example, in U.S. Pat. No. 3,139,657, epoixde resin compositions are cured through the use of normally gaseous curing agents. Examples of such curing agents include certain inorganic nitrogen and halogen compounds such hydrogen halides, boron-halogen compounds, silica-halogen compounds and nitrogen-halogen compounds. It is essential, however, that the epoxide composition be in contact with a solid heat absorbent during its treatment with the gaseous curing agent and that the epoxide compositions be in the form of a thin film with its surface area exposed for contact with a gaseous agent. The patentees state that films greater than about 0.01 inch thickness cannot be completely cured by this process.

In the foundry industry, sand is coated with resin binders and formed into molds and cores for the production of precision castings. A wide variety of techniques has been developed for the manufacture of sand cores and molds. These involve the hot bos technique for mold and core formation; the shell method; the "No-Bake", and the cold-box technique.

In the hot box and shell methods, sand molds and cores are formed by heating a mixture of sand with a thermosetting resin at a temperature of about 150°–320° C. in contact with patterns which produce the desired shape for the mold or core. The resin is polymerized and a core or mold is formed. Procedures of this type are described in Dunn et al U.S. Pat. No. 3,059,297 and Brown et al U.S. Pat. No. 3,020,609.

A particular disadvantage of the hot box and shell methods is the necessity for heating the pattern boxes to 150°–320° C. to polymerize and cure the resin binder. This involves considerable expense and is generally a high cost technique.

The cold box techniques for core and mold formation involve the use of sand mixed or coated with resins which may be cured at room temperature by acid or base catalysis. Acid or base catalyst have been used in liquid, solid or gaseous form. Typical cold box processes are shown in Blaies U.S. Pat. No. 3,008,205; Dunn et al U.S. Pat. No. 3,059,297; Peters et al U.S. Pat. No. 3,108,340; Brown et al U.S. Pat. No. 3,184,814; Robins U.S. Pat. No. 3,639,654; Australian Pat. No. 453,160 and British Pat. No. 1,225,984. Many of these processes involve the use of sulfur-containing acid catalyst such as benzene sulfonic acid, toluene sulfonic acid and the like.

A few years ago, a process was developed for room temperature polymerization of condensation resins in which an acid-curing agent is generated in situ in the resin or on a sand-resin mix. It had previously been suggested in U.S. Pat. No. 3,145,438 to inject $SO_3$ in a form of a gas into a mixture of sand and resin to cure the resin at room temperature. It was found, however, that this process causes an instantaneous curing of the resin in the region subjected to treatment by $SO_3$ which impedes the diffusion of this gas to other parts of the resin, particularly the central parts of the mixture.

Subsequently, a method was developed which avoided this difficulty. In Richard U.S. Pat. No. 3,978,339, it is disclosed that sand may be coated with a suitable oxidizing agent, such as an organic peroxide, and coated with the resin to be used in binding the sand into the form of a core or mold. The sand-resin mixture is then formed into suitable shape and treated with gaseous $SO_2$. The $SO_2$ is oxidized, in situ, to $SO_3$ and conveted to sulfur-containing acid by water present in the mixture. The sulfure-containing acid which is generated in situ causes a raid and uniform polymerization of the resin at room temperature. This process has proved successful commercially and has been applied to phenolic resins, furan resins, and urea-formaldchyde resins, as well as mixtures and copolymers thereof.

In the cold box method of Richard U.S. Pat. No. 3,879,339, there are a large variety of peroxides disclosed which may be added to sand along with resins which are used in forming sand cores or molds. This composition is subsequently formed into shape and treated with gaseous $SO_2$. The peroxides which are disclosed in the Richard patent are mostly quite expensive and, in many cases, are difficult to handle and to ship or transport. Organic peroxides require special approval for transportation in interstate commerce. Organic peroxides are often highly flammable or present other fire hazards. Organic peroxdies also are often shock sensitive and may explode or detonate under certain conditions. As a result, not all organic peroxides can be used in the Richard process because of economic and safety considerations.

The prior art discloses some application of epoxy resins to the manufacture of foundry cores and molds but these resins usually require the use of strong acid gases for curing which can give rise to serious problems, e.g. corrosion, etc., with the equipment and difficulties in the use of the epoxy bonded products.

Kottle et al U.S. Pat. No. 3,145,438 discloses a gaseous curing process for curing resins for binding sand and abrasive granules, i.e. sand cores and molds. The resins disclosed are primarily furfuryl alcohol formaldehyde resins and also certain epoxy resins including epoxidized linseed oil, mono- and divinylcyclohexene dioxide, butadiene dioxide, glycidyl methacrylate and its polymers. The curing gases are strong acid gases including boron trifluoride, boron trichloride, hydrogen chloride, sulfur trioxide.

Moore U.S. Pat. No. 3,107,403 discloses the preparation of sand cores or molds using epoxy resins in which the molding composition is cured by treatment with a strong Lewis acid, such as boron trifluoride, titanium tetrachloride, tin tetrachloride, etc.

Walker et al U.S. Pat. No. 3,428,110 discloses a process for preparing sand cores and molds using polyisocyanates and a curable resin, e.g. phenolic, which is cured by treatment with a gaseous amine.

Bickerdike et al U.S. Pat. No. 3,519,056 discloses a method of manufacturing a mold for metal casting in which the mold is formed of mineral fibers and includes a thermosetting resin including an epoxy resin or a phenolic resin. The resins are cured at a high temperature.

Stewart et al U.S. Pat. No. 4,176,114 discloses the preparation on foundry cores and molds using resins modified with polyfurfuryl alcohol. The sand is treated with resin and an organic peroxide or hydroperoxide and the gassed with sulfur dioxide.

Steinbacher U.S. Pat. No. 4,050,500 discloses a shell molding process using a soluble silicate, such as sodium silicate, as a binder. The sodoum silicate is used to bind the sand in addition to a thermosetting organic resin. The resins are cured by treatment with peroxides such as benzoyl peroxide or t-butyl perbenzoate.

British Pat. No. 2,066,714 describes processes for preparing shaped foundry articles using a binder material which comprises an ethyleincally unsaturated monomer and curing by means of a free radical initiator. The initiator comprises an organic peroxide and a catalytic agent such as sulfur dioxide. Examples of monomers described as being useful include acrylates, and modified acrylate copolymers such as epoxy-acrylates, polyether-acrylates, polyester-acrylates and polyester-urethane-acrylates.

SUMMARY OF THE INVENTION

The present invention relates to new and useful curable epoxy resin compositions comprising a mixture of an acid curable epoxy resin and a minor amount of an oxidizing agent which is capable of reacting with sulfur dioxide to form a catalyst for curing said epoxy resin. The invention also relates to methods for curing said epoxy resins and the use of such curable epoxy resins in the preparation of formed shaped filled bodies. The curable epoxy resins of the invention have been found to be useful particularly in the formation of foundry cores and molds such as sand cores or molds.

DESCRIPTION OF THE PREFERRED EMBODIMENTS

The compositions of this invention are curable epoxy resin compositions which comprise a mixture of an acid curable epoxy resin and a minor amount of an oxidizing agent capable of reacting with sulfur dioxide to form a catalyst for curing said epoxy resin.

The epoxy resins utilized in the invention may be any one of a number of well known resins which are acid-curable and which are characterized by the presence therein of an epoxide group, i.e.,

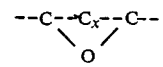

wherein x is zero or a small whole number. Such resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic) alkane or a tetrakis-(hydroxy-aromatic) alkane with a halogen-substituted aliphatic epoxide in the presence of a base such as, for example, sodium hydroxide or potassium hydroxide. Examples of the halogen-substituted aliphatic epoxides include epichlorohydrin, 4-chloro-1,2-epoxy-butane, 5-bromo-1,2-epoxypentane, 6-chloro-1,3-epoxyhexane and the like. In general, it is preferred to use a chlorine substituted terminal denoting that the epoxide group is on the end of the alkyl chain.

The most widely used epoxy resins are diglycidyl ethers of bisphenol A. These are made by epichlorohydrin with bisphenol A in the presence of an alkaline catalyst. By controlling the operating conditions and varying the ratio of epichlorohydrin to bisphenol A, products of different molecular weight can be made.

Other usable epoxy resins include the diglycidyl ethers of other bisphenol compounds such as bisphenol B, F, G and H.

Epoxy resins of the type described above based on various bisphenols are available from a wide variety of commercial sources. One group is known by the general trade designation "Epon" resins and are available from Shell Chemical Company. For example, "Epon 820" is an epoxy resin having an average molecular weight of about 380 and is prepared from 2,2-bis-(p-hydroxyphenol) propane and epichlorohydrin. Similarly, "Epon 1031" is an epoxy resin having an average molecular weight of about 616 and is prepared from epichlorohydrin and symmetrical tetrakis-)p-hydroxyphenol) ethane. "Epon 828" has a molecular weight of 350-400 and an epoxide equivalent of about 175-210.

Another group of commercially available epoxy resins is identified under the general trade designation EPI-REZ (Celanese Resins, a division of Celanese Coatings Company). For example, EPI-REZ 510 and EPI-REZ 509 are commercial grades of the diglycidyl ether or bisphenol A differing slightly in viscosity and epoxide equivalent.

Another class of epoxy resins useful in the present invention is the novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also can be utilized in the present invention. Epoxy resins having non-benzenoid molecular structures generally are referred to in the art as being aliphatic epoxy resins or cycloaliphatic epoxy resins. Cycoaliphatics can be produced by the peracetic epoxidation of cyclic olefins and by the condensation of an acid such as tetrahydrophthalic with epichlorohydrin, followed by dehydrohalogenation. The aliphatic epoxy resins can be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin (and others mentioned above) to form liquid epoxy resins characterized by viscosities which are lower than epoxy resins derived from aromatic hydroxy compounds. When cured, such aliphatic epoxy resins are not as brittle as the aromatic epxoy resins, and in many instances, exhibit elastomeric properties. Aliphatic epoxy resins are available commercially from a variety of sources including, for example, Shell Chemical Company and Reichhold Chemicals, Inc. Specific examples include Epon 562 from Shell Chemical Company having a viscosity of 90-150 centipoises at about 23° C., an epoxide equivalent of 140-165, and a hydroxyl equivalent weight of about 65.

In accordance with the present invention, an oxidizing agent is included as a curing or hardening agent in the acid curable epoxy resin formulations. The oxidizing agents which are incorporated into the acid curable epoxy resin compositions of the invention are oxidizing agents which will react with sulfur dioxide to form a catalyst of curing the epoxy resin.

Numerous oxidizing agents are suitable for use with the epoxy resins of the invention. Suitable agents include peroxides, hydroperoxides, hydroxy hydroperoxides, chlorates, perchlorates, chlorites, hydrochlorides, perbenzoates, permanganates, etc. Preferably, however, the oxidizing agent is a peroxide, hydroperoxide or a mixture of a peroxide or hydroperoxide with hydrogen peroxide. The organic peroxides may be aromatic or alkyl peroxides. Examples of useful diacyl peroxides include benzoyl peroxide, lauroyl peroxide and decanoyl peroxide. Ketone peroxides are particularly useful and these include methyl ethyl ketone peroxide, isobutyl methyl ketone peroxide, and 2,4-pentane dione peroxide. Examples of peroxy ester oxidizing agents include t-butyl peroctoate, t-butyl peracetate, t-butyl perbenzoate and t-amul peroctoate. Examples of alkyl peroxides include dicumyl peroxide and di-t-butyl peroxide. Examples of hydroperoxides useful in the invention include t-butyl hydroperoxide, cumene hydroperoxide, paramenthane hydroperoxide, etc. Mixtures of one or more of the above organic peroxides or hydroperoxides can be utilized with hydrogen peroxide as curing or hardening agents or accelerators. The compositions of the invention will contain from about 15 to about 40% or 50% by weight of the oxidizing agent based on the weight of said epoxy resin.

It has been found that the acid curable epoxy resins of the invention which comprise a mixture of the epoxy resin and an oxidizing agent such as a peroxide can be cured by treating said mixture with gaseous sulfur dioxide. A nearly instantaneous cure is initiated resulting in a resin having good strength and surface hardness which is capable as being handled immediately. The result is surprising, since the literature does not contain any description of the curing of epoxy resins in this manner. Generally, the epoxy resin-peroxide mixture is contacted with the sulfur dioxide gas for a period of from a fraction of a second to about five minutes at a temperature of from ambient temperature to about 150° C. In some instances, the sulfur dioxide can be suspended in a stream of a carrier gas in a known manner. Examples of carrier gases which are normally used for this purpose are air and nitrogen. The amount of sulfur dioxide required to cure the epoxy resin-peroxide mixture is a catalytic amount, generally as little as about 0.5% sulfur dioxide based on the weight of the carrier gas is adequate to cause polymerization and curing. As mentioned, however, it is also feasible to contact the epoxy-peroxide mixture directly with sulfur dioxide in the absence of any carrier gas.

The acid curable epoxy resins of the present invention can be modified by the addition of various monomers and polymers which effect desirable properties in the cured epoxy system. For example, the thermal stability of the epoxy system can be increased by mixing various monomers with the epoxy resin-oxidizing agent mixture. These mixtures then can be cured with sulfur dioxide in the manner described above.

Examples of monomeric materials which can be blended with the acid-curable epoxy resins in accordance with this invention include acrylic or vinyl monomers, furfuryl alcohol, polyfurfuryl alcohol, a formaldehyde based thermosetting resin, urethane resin, or mixtures thereof. The exact mechanism by which these specified monomers and polymers modify the properties of the acid curable epoxy resins is not known at this time. It has been found that up to about 50% by weight of the above-specified monomers and polymers can be mixed with the epoxy resin to form modified epoxy resin systems in accordance with the invention. Acrylic compounds are particularly useful as modifiers for the epoxy systems, and specific examples include trimethylol propane triacrylate and furfuryl methacrylate. Examples of the formaldehyde-based thermosetting resins useful as modifiers include phenol-formaldehyde resin or urea formaldehye resin. Resorcinol also is a particularly useful modifying agent.

In one preferred embodiment of the invention, curable epoxy resin compositions are prepared comprising a mixture of (a) a major amount of a solid particulate material, and
(b) a minor amount of (i) an acid curable epoxy resin and (ii) an oxidizing agent capable of reacting with sulfur dioxide to form a catalyst for curing said epoxy resin.

Generally, such curable epoxy resin compositions will comprise from about 0.2 to about 15% by weight of epoxy resin based on the weight of the particulate material, and the oxidizing agent will comprise from about 10 to about 40% by weight based on the weight of said resin. The acid-curable epoxy resin utilized in the compositions may be modified epoxy resins containing up to about 50% by weight of an acrylic or vinyl monomer, furfuryl alcohol, polyfurfuryl alcohol, resorcinol, a formaldehyde based thermosetting resin, urethane resin or mixtures thereof as described above.

A variety of solid particulate materials can be utilized in the epoxy resin compositions of this embodiment. The choice of particulate material will depend, in part, on the intended use of the filled epoxy resin. Among the particulate materials which can be used as fillers in the compositions of the invention include all materials containing a high proportion of silica such as siliceous sand, refractory materials, granular metal oxides such as zirconium oxides, and abrasive products such as carborundum, emery, quartz, garnet, aluminum oxide, silicon carbide, etc.

Other materials may be included in the compositions of the invention to provide additional desirable results. For example, coupling agents for improving the bond between the epoxy resin and the particulate materials and to improve the ability of the composite to return its original properties after prolonged aging and/or exposure to moisture. Examples of coupling agent known in the art include the silanes and titanates. Chemically, the coupling agents are hybrid materials that possess the functionality of an organic reactive group at one end of the molecule and the inorganic alkoxysilane or alkoxytitanate functionality at the other. Typical organofunctional groups found in the silanes include the vinyl, chloralkyl, epoxy, methacrylate, amine and styrylamine. The silane coupling agents known in the art are particularly useful in the filled composition of the invention.

The mixtures comprising the solid particulate materials, epxoy resin, oxidizing agent and other optional additives such as silanes can be formed into various shapes utilizing molds. While the mixture is in the mold, it is treated with sulfur dioxide gas to effect a nearly instantaneous cure as described above.

The introduction of gas into the shaped composition can be carried out by known processes in various ways depending on whether a mold or a core is being produced. In the case of a core, for example, the composition is shaped in its mold, which possesses orifices equipped with filters, connected to the outside, and through which the gas is introduced directly, under pressure, into the composition. During the production of a mold from the composition, the reverse procedure is followed, by clamping the mixture of sand and resin on a pattern and by introducing the gas via a plurality of channels machined in this pattern.

After manual, mechanical, hydraulic or pneumatic clamping of the composition consisting of granular filler, epoxy resin and oxidizing agent, the gas is injected at ambient temperature and at a pressure which can vary depending on the dimensions of the object to be manufactured. The pressure must be sufficient for the gas to be dispersed uniformly throughout the entire bulk of the composition and to escape to the outside of the mold. The pressures which are usually employed are between about 0.3 and 5 atmospheres. The shaped articles prepared in this manner exhibit good strength and surface hardness and can be handled immediately.

In this manner, foundry cores and molds can be prepared readily, and the method offers several advantages over processes using condensation type curing resins. One important advantage is the freedom from formaldehyde in the system since most condensation resins, for example, phenolic, urea formaldehyde, furfuryl alcohol-formaldehyde, etc. liberate formaldehyde during curing. Epoxy resins do not liberate significant formaldehyde during curing. Another important advantage of the compositions of the invention is that there is a reduced amount of water in the system. The epoxy formulations used generally contain less than one percent of water as compared to 2 to 8 percent in furan resins which previously have been cured with sulfur dioxide. Moreover, little or no water is liberated during the curing reaction with a ring opening and cross-linking reaction.

A further advantage of the epoxy resin compositions of the invention is the reduction of migration of reaction by-products. In the process using condensation resins, there is a tendency to cure more slowly near the surface of the mold due to absorption of the heat of reactions, and possibly migration of reaction by-products toward the mold surfaces. When the core box temperature is below ambient temperature, this is a problem which requires higher concentrations of peroxide to produce an article with sufficiently hard surface. The epoxy resin system does not appear to have the effect. Excellent core hardness is obtained even at artificially low levels of peroxide.

Further advantages are observed in the improved performance with high acid demand lake sands and improved bench life. Furan resins, for example, perform well on low acid demand silica sands, but the basicity of high acid demand lake sands retards the cure, and higher levels of resin and peroxide are needed. This greatly increases system costs and the amount of organic materials in the sand. The epoxy system of the present invention performs much better on the sands, and in the case of Manley 1-L lake sand, a common lake sand used widely in foundry applications, no increse in resin or peroxide is needed over that required with a very low acid demand silica sand such as Wedron 5040.

The length of time the sand-resin peroxide mix can be stored, open to the atmosphere, and still produce an acceptable article when treated with sulfur dioxide is termed the bench life. In the case of Manley 1-L sand, the bench life for furan resin is 12-16 hours, depending on the sand temperature. With the epoxy system of the invention, a bench life of six days has been observed. Under favorable conditions, bench life of the furan resin is three days on a clean silica sand. With the same sand, the epoxy system of the invention has been observed to have a bench life in excess of ten days.

A still further advantage of the use of the epoxy resin systems of the invention is a substantial saving in cost, especially on high acid demand sands where less resin is required. The average peroxide percent with the epoxide resin is 30% whereas the furan resin requires 40 to 50% of the peroxide depending on the sand type. The epoxy process works well with a low cost cumene hydroperoxide catalyst. Because the epoxy system requires less peroxide, less sulfur dioxide is needed for catalyzation.

The following examples illustrate the compositions and processes of the invention. Unless otherwise indicated all parts and percentages are by weight.

EXAMPLE I

A mixture of 100 parts of Epon 828 resin, a bisphenol-A type epoxy resin, and 30 parts of cumene hydroperoxide is prepared by mulling for about five minutes. The mixture is applied as a film and heated with sulfur dioxide for about 0.5 second at ambient temperature. The initial curing of the resin results in a slightly flexible epoxy film.

EXAMPLE II

Core Binding with Epoxy Resins

In this experiment, a Wedron 5040 sand is mixed with 1.0% wt. (based on the sand) of Epon 828 resin and mulled for three minutes. Epon 828 is a bisphenol-A type epoxy resin. Cumene hydroperoxide, 30% wt. (based on the resin weight) is added, and the mixture mulled for an additional three minutes. The sand-resin peroxide mix is then rammed or blown into a mold (a standard dogbone shaped specimen mold) and treated with sulfur dioxide for about 0.5 second at room temperature, followed by a 15 second air purge. Gassing times of about 0.3 seconds to about 5 minutes and temperatures from room temperature to about 150° C. can be used.

The initial cure of the epoxy system is characterized by a tough, slightly flexible cure. The flexiblity is an advantage in many applications, resulting in reduced core breakage upon removal of the article from the mold. In some cases, however, a rigid initial cure is preferred to prevent deformation of thin, intricate designs. It has been found that modification of the epoxy resin with 5–15% phenol-formaldehyde resin results in a more rigid initial cure and higher initial tensile strength.

The product obtained after 20 seconds, as described above, is capable of being handled immediately. This product has equal or better hardness and tensile strength than a like product made using condensation type resins.

This procedure also may be repeated using bisphenol-F type epoxy resins and epoxy novolac resins.

EXAMPLE III

Core Binding with Modified Epoxy Resin

In another experiment, a Wedron 5040 sand is mixed with 1.0% wt. (based on the sand) of Epon 828 resin modified with 15% furfuryl alcohol (or furfuryl alcohol-formaldehyde polymer) and mulled for three minutes. Cumene hydroperoxide, 30% wt. (based on the resin weight) is added and the mixture mulled for an additional three minutes. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The product obtained after 20 seconds, as described above, is capable of being handled immediately. This product has equal or better hardness and tensile strength than a like product made using condensation type resins.

This procedure may be repeated using bisphenol-F type epoxy resins and epoxy novolac resins.

EXAMPLE IV

Baking of Epoxy Bonded Cores

The specimens produced in Examples II and III are baked in a muffle furnace at 990° C. After two minutes the biscuits are removed and tapped with a small hammer to determine ease of breakage. The furfuryl alcohol (or furfuryl alcohol-formaldehyde) composition is noticeably harder. These experiments indicate that an increase in thermal stability results from modification of the epoxy with furfuryl alcohol or furfuryl alcohol-formaldehyde resin.

EXAMPLE V

Core Binding with Furfuryl Alcohol Modified Epoxy

A Wedron 5040 sand is mixed with 1.0% wt. (based on the sand) of Epon 828 resin modified with 15% furfuryl alcohol and mulled for three minutes. Cumene hydroperoxide 30% wt. (based on the resin weight) is added, and the mixture mulled for an additional three minutes. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used. The specimen or biscuit is then heated for a further period of five minutes at 110° C.

After cooling to room temperature, the biscuit has a tensile strength of 575 psi as compared to 290 psi without baking.

This procedure may be repeated using bisphenol-F type epoxy resins and epoxy novolac resins.

EXAMPLE VI

Core Binding with Modified Epoxy Resin

A Wedron 5040 sand is mixed with 1.0% wt. (based on the sand) of modified Epon 828 resin and mulled for three minutes. The composition used is: 80% Epon 828, 10% Phenolic resin, 0.2 A-187 Silane, 10% methanol to which there is added 20% trimethylolpropane triacylate. The phenolic resin used in this and the following examples is a resole with a 1.5:1 formaldehyde to phenol ratio reacted under basic conditions. Cumene hydroperoxide 30% wt. (based on the resin weight) is added and the mixture mulled for an additional three minutes. The sand-resin-peroxide mix is then rammed or blown into a mold (a standard dogbone shaped specimen mold) and gassed with sulfur dioxide for about 0.5 second at room temperature, followed by a 20 second air purge. Gassing times of about 0.3 seconds to about 5 minutes and temperatures from room temperature to about 150° C. can be used.

The product obtained after 20 seconds, as described above, is capable of being handled immediately. The product has an immediate tensile strength (after 20 seconds) of 156 psi as compared to 130 psi for the unmodified product. This product has equal or better hardness and tensile strength than a like product made using condensation type resins.

The procedure may be repeated using bisphenol-F type epoxy resins and epoxy novolac resins.

EXAMPLE VII

Core Binding with Modified Epoxy Resin

A Wedron 5040 sand is mixed with 1.0% wt. (based on the sand) of modified Epon 828 resin and mulled for three minutes. The composition used is: 80% Epon 828, 10% phenolic resin, 0.2 A-187 Silane, 10% methanol to which there was added 20% furfuryl methacrylate. Cumene hydroperoxide, 30% wt. (based on the resin weight) is added and the mixture mulled for an additional three minutes. The sand-resin-peroxide mix is then rammed or blown into a mold (a standard dogbone shaped specimen mold) and gassed with sulfur dioxide for about 0.5 second at room temperature, followed by a 20 second air purge. Gassing times of about 0.3 seconds to about 5 minutes and temperatures from room temperature to about 150° C. can be used.

The product obtained after 20 seconds, as described above, is capable of being handled immediately. The product has an immediate tensile strength substantially greater than the unmodified product. This product has equal or better hardness and tensile strength than a like product made using condensation type resins.

The procedure may be repeated using bisphenol-F type epoxy resins and epoxy novolak resins.

EXAMPLE VIII

Core Binding with Modified Epoxy Resin

A Wedron 5040 sand is mixed with 1.0% wt. (based on the sand) of modified Epon 828 resin and mulled for three minutes. The composition used is: 80% Epon 828, 10% phenolic resin, 0.2 A-187 Silane, 10% methanol to which there was added 20% furfuryl glycidyl ether. The furfuryl glycidyl ether is prepared by reacting epichlorohydrin with furfuryl alcohol using a base such as sodium hydroxide as catalyst and for dehydrohalogenation. Cumene hydroperoxide, 30% wt. (based on the resin weight) is added, and the mixture mulled for an additional three minutes. The sand-resin-peroxide mix is then rammed or blown into a mold (a standard dogbone shaped specimen mold) and gassed with sulfur dioxide for about 0.5 second at room temperature, followed by a 20 second air purge. Gassing times of about 0.3 seconds to about 5 minutes and temperatures from room temperature to about 150° C. can be used.

The product obtained after 20 seconds, as described above, is capable of being handled immediately. The product has an immediate tensile strength substantially greater than the unmodified product. This product has equal or better hardness and tensile strength than a like product made using condensation type resins. Sand/resin compositions of this type also have improved thermal stability.

The procedure may be repeated using bisphenol-F type epoxy resins and epoxy novolac resins.

EXAMPLE IX

In a series of experiments, a Manley 1-L sand is mixed with 1.0% wt. (based on the sand) of modified Epon 828 resin and mulled for three minutes. The composition used is 82% Epon 828, 5% resorcinol resin, 3% triphenyl phosphite, 0.2 A-187 Silane, 10% methanol. Cumene hydroperoxide 30% wt. (based on the resin weight) is added and the mixture mulled for an additional three minutes. The sand-resin-peroxide mix is held for periods of 5 minutes, 65 hours, and 6 days, respectively, rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The tensile and hardness data for these products are taken after the following periods of time:

| Age of Mix | 5 mins. | 65 hrs. | 6 days |
|---|---|---|---|
| 20 sec. | | | |
| Tensile psi | 108 | 80 | 80 |
| Core hardness | 88 | 79 | 77 |
| 30 min. | | | |
| Tensile psi | 279 | 200 | 190 |
| Core hardness | 91 | 88 | 85 |
| 24 hrs. | | | |
| Tensile psi | 280 | 260 | 240 |
| Core hardness | 92 | 90 | 86 |

The procedure may be repeated using bisphenol-F type epoxy resins and epoxy novolac resins.

EXAMPLE X

In another series of experiments, a 504 Wedron sand is mixed with 1.0% wt. (based on the sand) of modified Epon 828 resin and mulled for three minutes. The composition used is: 82% Epon 828, 5% resorcinol resin, 3% triphenyl phosphite, 0.2 A-187 Silane, 10% methanol. Cumeme hydroperoxide 30% wt. (based on the resin weight) is added and the mixture mulled for an additional three minutes. The sand-resin-peroxide mix is held for periods of 5 minutes, 65 hours, and 6 days, respectively and then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The tensile and hardness data for these products are as follows:

| Age of Mix | 5 mins. | 65 hrs. | 6 days |
|---|---|---|---|
| 20 sec. | | | |
| Tensile psi | 110 | 108 | 109 |
| Core hardness | 93 | 90 | 84 |
| 30 min. | | | |
| Tensile psi | 280 | 240 | 255 |
| Core hardness | 99 | 97 | 88 |
| 24 hrs. | | | |
| Tensile psi | 278 | 276 | 280 |
| Core hardness | 98 | 96 | 88 |

The procedures may be repeated using Bisphenol-F type epoxy resins and epoxy novolac resins.

EPOXY RESINS VS. FURAN RESINS OF LAKE SAND

A series of experiments is carried out evaluating the products obtained by the binding of lake sand with epoxy resin and with furan resin at various levels.

EXAMPLE XI

In this series of experiments, a Manley 1-L lake sand is mixed with resin and mulled for three minutes. Then, the peroxide is added and the mixture mulled for an additional three minutes. This procedure is repeated for an epoxy resin and for a furan resin at three different levels and for two different peroxides. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The epoxy resin used in Epon 828 in admixture with other materials. The composition used is: 82% Epon 828, 5% resorcinol resin, 3% triphenyl phosphite, 0.2 A-187 Silane, 10% methanol. The peroxide, 30% wt. (based on the resin weight) is added and the mixture mulled for an additional three minutes before molding. The furan resin is a furfuryl alcohol-formaldehyde copolymer reacted under acidic conditions. The formaldehyde to furfuryl alcohol ratio is 1.

The tensile and hardness data for the products using the different resins and the different peroxides are as follows:

| Resin | Epoxy | Furan | Furan | Furan |
|---|---|---|---|---|
| % (BOS) | 1.0 | 1.0 | 1.25 | 1.5 |
| Peroxide | Cumene Hydroperoxide | | Methylethyl ketone peroxide | |
| % (BOR) | 30 | 30 | 45 | 45 |
| Sand | Manley 1-L | | | |
| Temp. °F. | 77 | 77 | 76 | 76 |
| 20 sec. | | | | |
| Tensile psi | 108 | 74 | 88 | 120 |
| Core hardness | 88 | 45 | 69 | 82 |
| 30 min. | | | | |
| Tensile psi | 279 | 88 | 123 | 196 |
| Core hardness | 91 | 46 | 74 | 83 |
| 24 hrs. | | | | |
| Tensile psi | 274 | 92 | 135 | 171 |
| Core hardness | 91 | 35 | 81 | 86 |

BOS = based on sand
BOR = based on resin

The procedure may be repeated using Bisphenol-F type epoxy resins and epoxy novolac resins.

Evaluation of Different Epoxy Resin-Sand-Peroxide Mixes

EXAMPLE XII

In this series of experiments, a 5040 Wedron silica sand is mixed with resin and mulled for three minutes. The peroxide is added and the mixture mulled for an additional three minutes. This procedure is repeated for two epoxy resin compositions and at two different levels and for two different peroxides. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The epoxy resin used is Epon 828 in admixture with other materials. Composition A is: 80% Epon 828, 15% furfuryl alcohol, 5% resorcinol resin, 0.2 A-187 Silane. Composition B is: 82% Epon 828, 5% resorcinol resin, 3% triphenyl phosphite, 0.2 A-187 Silane, 10% methanol. Cumene hydroperoxide, 30% wt. (based on the resin weight) is added, and the mixture mulled for an additional three minutes before molding.

The tensile and hardness data for the products using the different resins and the different peroxides are as follows:

| RESIN | A | B | B |
|---|---|---|---|
| % (BOS) | 1.0 | 1.0 | 0.7 |
| Peroxide | Cumene Hydroperoxide | | |
| % (BOR) | 30 | 30 | 30 |
| Sand | 5040 Wedron | | |
| Temp. °F. | 76 | 76 | 77 |
| 20 sec. | | | |
| Tensile psi | 70 | 110 | 90 |
| Core hardness | 89 | 93 | 78 |
| 30 min. | | | |
| Tensile psi | 186 | 280 | 180 |
| Core hardness | 92 | 99 | 85 |
| 24 hrs. | | | |
| Tensile psi | 268 | 279 | 220 |
| Core hardness | 96 | 99 | 96 |

BOS = based on sand
BOR = based on resin

The procedure may be repeated using Bisphenol-F type epoxy resins and epoxy novolac resins.

EXAMPLE XIII

In this series of experiments, a Manley 1-L lake sand is mixed with resin and mulled for three minutes. The peroxide is added, and the mixture mulled for an additional three minutes. This procedure is repeated for different epoxy resin compositions at the same level and for two different peroxides. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The epoxy resin used is Epon 828 in admixture with other materials. Composition B is: 82% Epon 828, 5% resorcinol resin, 3% triphenyl phosphite, 0.2 A-187 Silane, 10% methanol. Composition C is 80% Epon 828, 15% methanol, 5% resorcinol and 0.2% A-187 Silane. The peroxide, 30% wt. (based on the resin weight) is added and the mixture mulled for an additional three minutes before molding.

The tensile and hardness data for the products using the different resins and the different peroxides are as follows:

| RESIN | B | C | B |
|---|---|---|---|
| % (BOS) | 1.0 | 1.0 | 1.0 |
| Peroxide | 60% $H_2O_2$ | CH | MEKP |
| % (BOR) | 15 | 30 | 30 |
| Temp. °F. | 76 | 77 | 75 |
| 20 sec. | | | |
| Tensile psi. | 50 | 116 | 70 |
| Core hardness | 10 | 81 | 65 |
| 30 min. | | | |
| Tensile psi | 50 | 200 | 86 |
| Core hardness | 12 | 82 | 78 |
| 24 hrs. | | | |
| Tensile psi | 40 | 270 | 148 |
| Core hardness | 10 | 86 | 95 |

BOS = based on sand
BOR = based on resin
CH = cumene hydroperoxide
MEKP = methylethyl ketone peroxide The procedure may be repeated using Bisphenol-F type epoxy resins and epoxy novolac resins.

EXAMPLE XIV

In this series of experiments, the sand is mixed with resin and mulled for three minutes. The peroxide is added, and the mixture mulled for an additional three minutes. This procedure is repeated for three different sands, three different epoxy resin compositions and at two different levels. Cumene hydroperoxide is used. The sand-resin-peroxide mix is then rammed or blown into a mold (a standard dogbone shaped specimen mold) and gassed with sulfur dioxide for about 0.5 second at room temperature, followed by a 15 second air purge. Gassing times of about 0.3 seconds to about 5 minutes and temperatures from room temperature to about 150° C. can be used.

The epoxy resin used is Epon 828 in admixture with other materials. Composition D is: 75% Epon 828, 15% furfuryl alcohol polymer 0.2% A-187 Silane, 10% methanol. Composition B is: 82% Epon 828, 5% resorcinol resin, 3% triphenyl phosphite, 0.2% A-187 Silane, 10% methanol. Composition E is 80% Epon 828, 10% phenolic resin, 0.2 A-187 Silane, 10% methanol. Cumene hydroperoxide, 30% wt. (based on the resin weight) is added, and the mixture mulled for an additional three minutes before molding.

The tensile and hardness data for the products using the different resin compositions and the different sands are as follows:

| RESIN | B | D | E |
|---|---|---|---|
| % (BOS) | 0.8 | 1.0 | 1.0 |
| Peroxide | | Cumene Hydroperoxide | |
| % (BOR) | 30 | 30 | 30 |
| Sand | Florida Zircon | Manley 1-L | 5040 Wedron |
| Temp. °F. | 75 | 77 | 78 |
| 20 sec. | | | |
| Tensile psi | 112 | 98 | 136 |
| Core hardness | 99 | 86 | 88 |
| 30 min. | | | |
| Tensile psi | 260 | 140 | 278 |
| Core hardness | 98 | 85 | 91 |
| 24 hrs. | | | |
| Tensile psi | 390 | 230 | 296 |
| Core hardness | 100 | 86 | 89 |

BOS = based on sand
BOR = based on resin

The procedure may be repeated using Bisphenol-F type epoxy resins, epoxy novolac resins, furfuryl glycidyl ether, etc.

EXAMPLE IV

A Wedron 5040 sand is mixed with 1.0% by weight (based on the weight of the sand) of Epon 828 resin modified with 20% of trimethylolpropane triacrylate (TMPTA) blended with 10% of methanol and 0.2% A-187 Silane and mulled for about three minutes. Cumene hydroperoxide, 30% wt. (based on the resin weight) is added and the mixture mulled an additional three minutes. The mixture is rammed or blown into a standard dogbone shaped specimen mold and gassed with sulfur dioxide for about 0.5 second at ambient temperature followed by a 15 second air purge. The tensile and hardness data for the specimens are taken after the following periods of time. For comparison, the above procedure is repeated using Epon 828 without the triacrylate but with 30% of the peroxide.

| | Epon 828 | TMPTA modified Epon 828 |
|---|---|---|
| 20 sec. | | |
| Tensile psi | 136 | 233 |
| Core hardness | 88 | 91 |
| 30 min. | | |
| Tensile psi | 270 | 320,384 |
| Core hardness | 90 | 90 |
| 24 hour | | |
| Tensile psi | 269 | 334,380 |
| Core hardness | 89 | 88 |

As can be seen above, the modification of the bisphenol-A epoxy resin formulation with 20% of the triacrylate increases the tensile strength by 75% in the first 20 seconds after gassing. In addition the rigidity of the article is greatly increased thereby permitting fabrication of thin sectioned complex cores such as water jacket and cylinder head cores. Another advantage is that the peroxide concentration needed for curing is reduced.

EXAMPLE XVI

A Wedron sand is mixed with 1.0% by weight (based on weight of the sand) of a mixture comprising 75 parts of an epoxy-novolac resin (EPN-1139 from Ciba Geigy) and 25 parts of Epon 828 blended with 10 methanol at 0.2% A-187 Silane. Specimens are prepared as described in Example XV using this formulation and similar formulation except that the peroxide is reduced to 20% and 7% of trimethylolpropane triacylate (TMPTA) is added to the formuation. For comparison specimens of unmodified Epon 828 also are prepared. The tensile and hardness data for specimens prepared in this example are as follows:

| | Epon 828 | Epon 828 EPN 1139 | Epon 828: EPN 1139: TMPTA |
|---|---|---|---|
| 20 sec. | | | |
| Tensile psi | 136 | 224 | 214 |
| Core hardness | 88 | 82 | 92 |
| 5 min. | | | |
| Tensile psi | — | 294 | 380 |
| Core hardness | — | 82 | 96 |
| 30 min. | | | |
| Tensile psi | 270 | 350 | 428 |
| Core hardness | 90 | 82 | 96 |
| 24 hour | | | |
| Tensile psi | 269 | 338 | 495 |
| Core hardness | 89 | 85 | 92 |

The above results demonstrate that the blend of epoxy and epxoy novolac produces stronger cores than the epoxy alone. It also has been found that the blend produces stronger cores than the epoxy novolac alone. The data also shows the improved results when the epoxy resin blend is modified with the TMPTA even when the amount of peroxide is reduced.

EXAMPLE XVII

A Wedron sand is mixed with 1.0% by weight (based on weight of the sand) of either an epoxy novolac resin (EPN-1139) containing only 10% methanol and 0.2% of A-187 Silane or a blend of 45% epoxy novolac resin EPN-1139 with 45% Epon 828 and 0.2% A-187 Silane and 10% methanol. Cumene hydroperoxide (30% wt.)

is mulled into the resin formulations and specimen shapes are prepared as in Example XV. The tensile and core hardness data are as follows:

|  | EPN-1139 | EPN-1139: Epon 828 |
|---|---|---|
| 20 sec. |  |  |
| Tensile psi | 160,182 | 162,168 |
| Core hardness | 85,89 | 88,86 |
| 30 min. |  |  |
| Tensile psi | 182 | 334 |
| Core hardness | 84 | 92 |
| 48 hour |  |  |
| Tensile psi | 210 | 372 |
| Core hardness | 80 | 93 |

The above data shows the superior strengths obtained when the combination of resins is used in the compositions of this invention.

It also has been found that various other binder resins normally used in the preparation of foundry molds and cores utilizing the combination of an oxidizing agent and sulfur dioxide as the curing agent can be improved by initially blending said resins with minor amounts of acid curable epoxy resins of the type described above. More specifically, it has been discovered that the strength of molds and cores prepared utilizing, for example, ethylenically unsaturated monomer binder materials such as described in British Pat. No. 2,066,714 which are generally monofunctional, difunctional, trifunctional and tetrafunctional acrylates; and acid-curing condensation type resins comprising a polyfurfuryl alcohol such as described in U.S. Pat. No. 4,176,114 can be increased by the incorporation of minor amounts, that is, up to about ;b 50% by weight, of acid curing epoxy resins. The following example illustrates this embodiment.

EXAMPLE XVIII

An acrylic resin is prepared by combining 2.5 moles of acrylic acid, 1 mole of diethylene glycol, 3 grams of concentrated sulfuric acid and 0.3 gram of hydroquinone. The mixture is reacted at about 95° C. in the presence of air for 3 hours. The mixture then is washed with distilled water, and the excess water is removed by vacuum distillation.

A portion of this acrylate product is modified with 30% by weight of Epon 828 resin and 0.2% of Z-6075 Silane. Another portion is modified only with 0.2% of Z-6075. Z-6075 is vinyl triacetoxysilane manufactured by Dow Corning.

Twenty grams of the Epon 828 modified acrylic is mixed with 2,000 grams of Wedron 5040 silica for two minutes in a Hobart mixer at low speed. Cumene hydroperoxide (1.6 grams) then is added and similarly mixed. Standard dogbone tensile specimens are prepared and gassed with 100% sulfur dioxide for 0.5 second. The 20 second tensile strength of the specimen is 120 psi with a core hardness of 85, and the 5 minute tensile strength if 150 psi with 85 core hardness.

A similar test on specimens prepared from the acrylate modified with the silane (no Epon 828) exhibits a 20 second tensile strength of 80 psi with a core hardness of 65, and a 5 minute tensile strength of 90 psi with a 65 core hardness. The above results demonstrate that the tensile strength of acrylic resins used in the sulfur dioxide process can be increased by modifying the acrylic resin with an acid curable epoxy resin. Similar results are obtained when furan resins are modified with minor amounts of acid curable epoxy resin.

I claim:

1. A curable binder composition comprising a mixture of
   (a) a major amount of a free radical curable ethylenically unsaturated binder material,
   (b) from 30 percent to 50 percent by weight of an epoxy resin, and
   (c) an oxidizing agent capable of reacting with sulfur dioxide to form a catalyst for curing said resin mixture, said percent by weight of (b) being based upon the total weight of (a) and (b).

2. The composition of claim 1 wherein the oxidizing agent is a peroxide.

3. The composition of claim 1 wherein the epoxy resin is selected from the group consisting of (1) mixed aliphatic-aromatic epoxy resins derived from a bis(hydroxy-aromatic) alkane or a tetrakis(hydroxy-aromatic) akane with a halogen-substituted aliphatic epoxide, (2) novolac resins, and (3) aliphatic epoxy resins.

4. The composition of claim 3 wherein the ethylenically unsaturated binder material is a monomer.

5. The composition of claim 4 wherein the ethylenically unsaturated monomer is a monofunctional, difunctional, trifunctional or tetrafunctional acrylate.

6. The compositions of claim 5 wherein the epoxy resin is a glycidyl ether of bisphenol A, B, F, G, or H.

7. The composition of claim 6 wherein the peroxide is methyl ethyl ketone peroxide, cumene hydroperoxide, paramenthane hydroperoxide, t-butyl hydroperoxide, diisopropyl benzene hydroperoxide, admixtures thereof or admixtures thereof with hydrogen peroxide.

8. A curable molding composition comprising a mixture of a major amount of a solid particulate material, and a minor amount of a binder composition comprising a mixture of
   (a) a major amount of a free radical curable ethylenically unsaturated binder material,
   (b) from 30 percent to 50 percent by weight of an epoxy resin, and
   (c) an oxidizing agent capable of reacting with sulfur dioxide to form a catalyst for curing said resin mixture, said percent by weight of (b) being based upon the total weight of (a) and (b).

9. The composition of claim 8 wherein the oxidizing agent is a peroxide.

10. The molding composition of claim 9 wherein the epoxy resin is selected from the group consisting of (1) mixed aliphatic-aromatic epoxy resins derived from a bis(hydroxy-aromatic) alkane or a tetrakis(hydroxy-aromatic) alkane with a halogen-substituted aliphatic epoxide, (2) novolac resins, and (3) aliphatic epoxy resins.

11. The composition of claim 10 wherein the ethylenically unsaturated binder material is a monomer.

12. The composition of claim 11 wherein the ethylenically unsaturated monomer is a monofunctional, difunctional, trifunctional or tetrafunctional acrylate.

13. The composition of claim 12 wherein the epoxy resin is a glycidyl ether of bisphenol A, B, F, G, or H.

14. The composition of claim 13 wherein the peroxide is methyl ethyl ketone peroxide, cumene hydroperoxide, paramenthane hydroperoxide, t-butyl hydroperoxide, diisopropyl benzene hydroperoxide, admixtures thereof or admixtures thereof with hydrogen peroxide.

15. The composition of claim 14 wherein the solid particulate filler comprises inorganic abrasive particles.

16. The composition of claim 15 wherein the solid particulate filler comprises sand.

17. A method of curing binder compositions containing at least one epoxy resin which comprises the steps of
    (a) preparing a mixture curable with gaseous sulfur dioxide comprising
        (i) a major amount of a free radical curable ethylencially unsaturated binder material,
        (ii) from 30 percent to 50 percent by weight an epoxy resin, and
        (iii) an oxidizing agent capable of reacting with sulfur dioxide to form a catalyst for curing said resin mixture, said percent by weight of (a) (ii) being based upon the total weight of (a) (i) and (a) (ii), and
    (b) contacting said mixture with gaseous sulfur dioxide.

18. The method of claim 17 wherein the oxidizing agent is a peroxide.

19. The method of claim 18 wherein the epoxy resin is selected from the group consisting of (1) mixed aliphatic-aromatic epoxy resins derived from a bis(hydroxy-aromatic) alkane or a tetrakis(hydroxy-aromatic) alkane with a halogen-substituted aliphatic epoxide, (2) novolac resins, and (3) aliphatic epoxy resins.

20. The method of claim 19 wherein the ethylenically unsaturated binder material is a monomer.

21. The composition of claim 20 wherein the ethylenically unsaturated monomer is a monofunctional, difunctional, trifunctional or tetrafunctional acrylate.

22. The method of claim 21 wherein the epoxy resin is a glycidyl ether of bisphenol A, B, F, G, or H.

23. The method of claim 22 wherein said peroxide is methyl ethyl ketone peroxide, cumene hydroperoxide, paramenthane hydroperoxide, t-butyl hydroperoxide, diisopropyl benzene hydroperoxide, admixtures thereof or admixtures thereof with hydrogen peroxide.

24. The method of claim 20 wherein the mixture is contacted with sulfur dioxide for a period of from a fraction of a second to about five minutes at a temperature of from ambient temperature to about 150° C.

25. A method of forming foundry's shapes which comprises the steps of
    (a) mixing a major amount of solid particulate material with a minor amount of a binder composition comprising a mixture of
        (i) a major amount of a free radical curable ethylenically unsaturated binder material,
        (ii) from 30 percent to 50 percent by weight of an epoxy resin, said percent by weight of (a) (ii) being based upon the total weight of (a) (i) and (a) (ii), and
        (iii) an oxidizing agent capable of reacting with sulfur dioxide to form a catalyst for curing said mixture,
    (b) forming said mixture into the desired shape, and
    (c) contacting said formed mixture with sulfur dioxide for a period of from a fraction of a second to about five minutes at a temperature of from room temperature to about 150 degrees C. to effect resin cure.

26. The composition of claim 25 wherein the oxidizing agent is a peroxide.

27. The method of claim 26 wherein the epoxy resin is selected from the group consisting of (1) mixed aliphatic-aromatic epoxy resins derived fromm a bis(hydroxy-aromatic) alkane or a tetrakis(hydroxy-aromatic) alkane with a halogen-substituted aliphatic epoxide, (2) novolac resins, and (3) aliphatic epoxy resins.

28. The method of claim 27 wherein the ethylenically unsaturated binder material is a monomer.

29. The method of claim 28 wherein the ethylenically unsaturated monomer is a monofunctional, difunctional, triflunctional or tetrafunctional acrylate.

30. The method of claim 29 wherein the epoxy resin is a glycidyl ether of bisphenol A, B, F, G, or H.

31. The method of claim 30 wherein the peroxide is methyl ethyl ketone peroxide, cumene hydroperoxide, paramenthane hydroperoxide, t-butyl hydroperoxide, diisopropyl benzene hydroperoxide, admixtures thereof or admixtures thereof with hydrogen peroxide.

32. The method of claim 31 wherein the solid particulate material is sand.

33. The method of claim 32 wherein the formed shape, after contact with sulfur dioxide, is purged with air or inert gas and baked at an elevated temperature.

* * * * *